(12) United States Patent
Heo et al.

(10) Patent No.: US 11,544,270 B2
(45) Date of Patent: Jan. 3, 2023

(54) HARDWARE ACCELERATOR PERFORMING SEARCH USING INVERTED INDEX STRUCTURE AND SEARCH SYSTEM INCLUDING THE HARDWARE ACCELERATOR

(71) Applicants: SK hynix Inc., Icheon (KR); Seoul National University R&DB Foundation, Seoul (KR)

(72) Inventors: Jun Heo, Yongin (KR); Jaeyeon Won, Seoul (KR); Yejin Lee, Seoul (KR); Jaeyoung Jang, Seoul (KR); Tae Jun Ham, Seoul (KR); Jae Wook Lee, Seoul (KR)

(73) Assignees: SK hynix Inc., Icheon (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 17/118,085

(22) Filed: Dec. 10, 2020

(65) Prior Publication Data
US 2021/0374131 A1 Dec. 2, 2021

(30) Foreign Application Priority Data

Jun. 2, 2020 (KR) ........................ 10-2020-0066219

(51) Int. Cl.
*G06F 16/2455* (2019.01)
*G06F 16/2457* (2019.01)
*G06F 16/22* (2019.01)
*G06F 16/28* (2019.01)
*G06F 16/248* (2019.01)

(52) U.S. Cl.
CPC .......... *G06F 16/2456* (2019.01); *G06F 16/22* (2019.01); *G06F 16/248* (2019.01); *G06F 16/24573* (2019.01); *G06F 16/287* (2019.01)

(58) Field of Classification Search
None
See application file for complete search history.

(56) References Cited

U.S. PATENT DOCUMENTS

| | | | |
|---|---|---|---|
| 8,423,499 B2 | 4/2013 | Ge et al. | |
| 2011/0320446 A1* | 12/2011 | Chakrabarti | ...... G06F 16/90335 707/737 |
| 2013/0159285 A1* | 6/2013 | Dees | ................. G06F 16/24542 707/718 |
| 2016/0098450 A1* | 4/2016 | Tandon | ............... G06F 16/2455 707/718 |
| 2019/0310937 A1* | 10/2019 | Bachmutsky | ......... H04L 49/109 |

OTHER PUBLICATIONS

Heo et al., IIU: Specialized Architecture for Inverted Index Search, Mar. 2020 (Year: 2020).*
Cao et al.., "FlexSaaS: A Reconfigurable Accelerator for Web Search Selection", Feb. 2019 (Year: 2019).*
(Continued)

*Primary Examiner* — Dawaune A Conyers

(57) ABSTRACT

A hardware accelerator includes a block processing circuit configured to read a block from a list stored in an inverted index structure; and a search core configured to extract a document number out of a read block read by the block processing circuit and to calculate a score corresponding to the document number.

8 Claims, 21 Drawing Sheets

(56) References Cited

OTHER PUBLICATIONS

W. B. Croft, D. Metzler, and T. Strohman, "Search engines: Information retrieval in practice.," 2010.

Y. Liu, J. Wang, and S. Swanson, "Griffin: Uniting cpu and gpu in information retrieval systems for intra-query parallelism," ACM SIGPLAN Notices, vol. 53, No. 1, pp. 32x 337, 2018.

S. Ding, J. He, H. Yan, and T. Suel,"Using graphics processors for high performance ir query processing," in Proceedings of the 18th International Conference on World Wide Web, pp. 421-430, 2009.

D. Wu, F. Zhang, N. Ao, F. Wang, X. Liu, and G. Wang, "A batched gpu algorithm for set intersection," in Proceedings of the 10th International Symposium on Pervasive Systems, Algorithms, and Networks, 2009.

D. Cutting and J. Pedersen, "Optimizations for dynamic inverted index maintenance," in Proceedings of the 13th Annual International ACM SIGIR Conference on Research and Development in Information Retrieval, pp. 405-411, 1989.

S. Vigna, "Quasi-succinct indices," in Proceedings of the Sixth ACM International Conference on Web Search and Data Mining, 2013.

M. Zukowski, S. Heman, N. Nes, and P. Boncz, "Super-scalar ram-cpu cache compression," in Proceedings of the 22nd International Conference on Data Engineering, pp. 59-59, 2006.

H. Yan, S. Ding, and T. Suel, "Inverted index compression and query processing with optimized document ordering," in Proceedings of the 18th International Conference on World Wide Web, pp. 401-410, 2009.

D. Lemire and L. Boytsov, "Decoding billions of integers per second through vectorization," Software: Practice and Experience, vol. 45, No. 1, pp. 1-29, 2015.

J. Wang, C. Lin, R. He, M. Chae, Y. Papakonstantinou, and S. Swanson, "Milc: Inverted list compression in memory," Proceedings of the VLDB Endowment, vol. 10, No. 8, pp. 85✓ 864, 2017.

J. S. Culpepper and A. Moat, "Efficient set intersection for inverted indexing," ACM Transactions on Information Systems, vol. 29, No. 1, pp. 1-25, 2010.

J. Wang, D. Park, Y.-S. Kee, Y. Papakonstantinou, and S. Swanson, "SSD in-storage computing for list intersection," in Proceedings of the 12th International Workshop on Data Management on New Hardware, pp. 1-7, 2016.

S. E. Robertson, S. Walker, M. Beaulieu, and P. Willett, "Okapi attrec-7: Automatic ad hoc, filtering, vic and interactive track," Nist Special Publication SP, No. 500, pp. 253-264, 1999.

F. Silvestri and R. Venturini, "Vsencoding: efficient coding and fast decoding of integer lists via dynamic programming," in Proceedings of the 19th ACM International Conference on Information and Knowledge Management, pp. 1219-1228, 2010.

P. Ferragina, I. Nitto, and R. Venturini, "On optimally partitioning a text to improve its compression," Algorithmica, vol. 31, No. 1, 2011.

A. L. Buchsbaum, G. S. Fowler, and R. Giancarlo, "Improving table compression with combinatorial optimization," Journal of the ACM, vol. 50, No. 6, pp. 825-851, 2003.

P. Rosenfeld, E. Cooper-Balis, and B. Jacob, "Dramsim2: A cycle accurate memory system simulator," IEEE Computer Architecture Letters, vol. 10, No. 1, pp. 16-19, 2011.

J. Bachrach, H. Vo, B. Richards, Y. Lee, A. Waterman, R. Avizienis, J. Wawrzynek, and K. Asanovic, "Chisel: Constructing hardware in a scala embedded language," in Design Automation Conference, 2012.

S. Robertson and H. Zaragoza, "The probabilistic relevance framework: Bm25 and beyond," Foundations and Trends in Information Retrieval, vol. 3, No. 4, pp. 333-389, 2009.

M. Petri and A. Moffat, "Compact inverted index storage using general-purpose compression libraries," Software: Practice and Experience, vol. 48, No. 4, pp. 974-982, 2018.

A. Mallia, M. Siedlaczek, J. Mackenzie, and T. Suel, "PISA: Performant indexes and search for academia," Proceedings of the Open-Source IR Replicability Challenge (OSIRRC) co-located at SIGIR, pp. 50-56, 2019.

JEDEC, JEDEC Standard JESD235A: High Bandwidth Memory (HBM) DRAM. JEDEC Solid State Technology Association, 2015.

L. H. Thiel and H. Heaps, "Program design for retrospective searches on large data bases," Information Storage and Retrieval, vol. 8, No. 1, pp. 1-20, 1972.

G. Ottaviano and R. Venturini, "Partitioned elias-fano indexes," in Proceedings of the 37th International ACM SIGIR Conference on Research & Development in Information Retrieval, pp. 273-282, 2014.

G. E. Pibiri and R. Venturini, "Variable-byte encoding is now space-efficient too," CoRR, vol. abs/1804.10949, 2018.

D. Lemire, L. Boytsov, and N. Kurz, "Simd compression and the intersection of sorted integers," Software: Practice and Experience, vol. 46, No. 6, pp. 723-749, 2016.

F. Zhang, J. Zhai, X. Shen, O. Mutlu, and W. Chen, "Efficient document analytics on compressed data: Method, challenges, algorithms, insights," Proceedings of the VLDB Endowment, vol. 11, No. 11, 2018.

I. Rae, A. Halverson, and J. F. Naughton, "In-rdbms inverted indexes revisited," in Proceedings of the IEEE 30th International Conference on Data Engineering, pp. 352-363, 2014.

S. Shah and A. Shaikh, "Hash based optimization for faster access to inverted index," in Proceedings of the 2016 International Conference on Inventive Computation Technologies, vol. 1, pp. 1-5, 2016.

J. Zhou, Q. Guo, H. V. Jagadish, L. Krcal, S. Liu, W. Luan, A. K. H. Tung, Y. Yang, and Y. Zheng, "A generic inverted index framework for similarity search on the gpu," in Proceedings of the IEEE 34th International Conference on Data Engineering, pp. 893-904, 2018.

D. Wang, W. yu, R. J. Stones, J. Ren, G. Wang, X. Liu, and M. Ren, "Efficient gpu-based query processing with pruned list caching in search engines," in Proceedings of the IEEE 23rd International Conference on Parallel and Distributed Systems, pp. 21X 224, 2017.

D. Wu, F. Zhang, N. Ao, G. Wang, X. Liu, and Jing Liu, "Efficient lists intersection by cpu-gpu cooperative computing," in 2010 IEEE International Symposium on Parallel Distributed Processing, Workshops and Phd Forum, pp. 1-8, 2010.

N. Ao, F. Zhang, D. Wu, D. S. Stones, G. Wang, X. Liu, J. Liu, and S. Lin, "Efficient parallel lists intersection and index compression algorithms using graphics processing units," Proceedings of the VLDB Endowment, vol. 4, No. 8, pp. 470-481, 2011.

Gunther, Milne, and Narasimhan, "Assessing document relevance with run-time reconfigurable machines," in Proceedings of the IEEE Symposium on FPGAs for Custom Computing Machines, pp. 10-17, 1996.

J. Yan, N. Xu, Z. Xia, R. Luo, and F. Hsu, "A compression method for inverted index and its fpga-based decompression solution," in Proceedings of the 2010 International Conference on Field-Programmable Technology, pp. 261-264, 2010.

J. Yan, Z. Zhao, N. Xu, X. Jin, L. Zhang, and F. Hsu, "Efficient query processing for web search engine with fpgas," in Proceedings of the IEEE 20th International Symposium on Field-Programmable Custom Computing Machines, pp. 97-100, 2012.

M. Busch, K. Gade, B. Larson, P. Lok, S. Luckenbill, and J. Lin, "Early-bird: Real-time search at twitter," in Proceedings of the 2012 IEEE 28th International Conference on Data Engineering, pp. 1360-1369, 2012.

"Okapi BM25.", Sep. 12, 2019, 4 pages, https://en.wikipedia.org/wiki/Okapi_BM25.

"Welcome to Apache Lucene", Mar. 11, 2020, 2 pages, https://lucene.apache.org/.

"Apache solr 8.4.1/Solr is the popular, blazing-fast, open source enterprise search platform built on Apache Lucene", Mar. 11, 2020, 9 pages, https://lucene.apache.org/solr/.

"Get Started with Elasticsearch", Mar. 13, 2020, 2 pages, https://www.elastic.co/.

"The clueweb12 dataset", Mar. 30, 2018, 2 pages, https://lemurproject.org/clueweb12/.

(56) References Cited

OTHER PUBLICATIONS

"Intel VTune Amplifier/Locate Performance Bottlenecks Fast", Jan. 28, 2020, 7 pages, https://software.intel.com/en-us/vtune.

"The fastPFOR C++ library: Fast integer compression", Oct. 11, 2018, 6 pages, https://github.com/lemire/FastPFor.

"News Dataset Available" Common crawl—ccnews dataset, Oct. 4, 2016, 2 pages, http://commoncrawl.org/2016/10/news-dataset-available.

"Text REtrieval conference (trec)", Feb. 28, 2020, 2 pages, https://trec.nist.gov/.

"Total Number of Pages Indexed by Google", Statistic Brain Research Institute, Mar. 21, 2017, 4 pages, https://www.statisticbrain.com/total-number-of-pages-indexed-by-google/.

"PublicServers", Jun. 28, 2019, 7 pages, https://cwiki.apache.org/confluence/display/solr/PublicServers#PublicServers-PublicWebsitesusingSolr.

* cited by examiner

FIG. 1

| Word | List (L) | |
|---|---|---|
| | Document ID (DID) | Word Frequency (TF) |
| Business | 0, 2, 11, 20, 38, 46 | 2, 1, 3, 5, 1, 1 |
| Cameo | 1, 11, 38, 39, 46, 55, 62 | 2, 1, 1, 7, 4, 2, 3 |
| Jarvis | 3, 5, 8, 11, 12, 38, 46 | 6, 4, 1, 1, 1, 2, 4 |
| ... | | |

<Prior Art>

HARDWARE ACCELERATOR PERFORMING SEARCH USING INVERTED INDEX STRUCTURE AND SEARCH SYSTEM INCLUDING THE HARDWARE ACCELERATOR

CROSS-REFERENCE TO RELATED APPLICATION

The present application claims priority under 35 U.S.C. § 119(a) to Korean Patent Application No. 10-2020-0066219, filed on Jun. 2, 2020, which are incorporated herein by reference in its entirety.

BACKGROUND

1. Technical Field

Embodiments may relate to a hardware accelerator that performs a search operation using an inverted index structure and a search system using the hardware accelerator.

2. Related Art

Text-based search engines use an inverted index structure to process queries entered by users and provide corresponding search results.

FIG. 1 is a table illustrating an example of an inverted index structure.

The inverted index structure is a data structure that stores a word and a document number DID corresponding to that word.

Document numbers are stored in the form of a list, and word frequency TF information, which indicates a number of occurrences of the word in each document, may also be included in the list.

In FIG. 1, for example, document numbers DID of documents that include the word "Business" are 0, 2, 11, 20, 38, 46, and corresponding word frequencies TF are 2, 1, 3, 5, 1, 1.

Lists for other words such as "Cameo" and "Jarvis" may be created and saved in a similar form.

FIG. 2 is a flowchart that shows processing of a search command using an inverted index structure.

First, at step S10, a user inputs a text query including one or more words.

At step S20, a list corresponding to a word in the text query is read from the inverted index structure stored in the memory device.

In this case, the list is generally stored in compressed form to save storage capacity.

Accordingly, at step S30 the read list is decompressed.

When the query contains a plurality of words, a plurality of corresponding lists are read from the inverted index structure, decompressed if necessary, and then set operations such as intersection and union are performed on the resulting lists.

Accordingly, at step S40 a set operation such as an intersection or a union may be performed using the decompressed list(s).

When the set operation is performed, a plurality of results are produced, and score calculations for determining respective priorities of the plurality of results performed at step S50.

Finally, at step S60 the search result is output according to the calculated scores. For example, a predetermined number of results may be output in the order of the highest score.

As described above, when a user inputs a text query, a process including various operations such as decompression, set operation, and score calculation must be performed until the search result is output. This process may consume most of the query processing time.

Conventional search engines consume a lot of energy while processing search commands using software, and have deficiencies with respect to latency and throughput.

SUMMARY

In accordance with an embodiment of the present disclosure, a hardware accelerator may include a block processing circuit configured to read a block from a list stored in an inverted index structure; and a search core configured to extract a document number out of a read block read from the block processing circuit and to calculate a score corresponding to the document number In accordance with an embodiment of the present disclosure, a search system may include a memory device storing an inverted index structure including a word and a list corresponding to the word; a host configured to provide a search command including one or more words; and a hardware accelerator configured to generate a search result corresponding to the search command using the inverted index structure, wherein the hardware accelerator includes a block processing circuit configured to read a block from a list stored in an inverted index structure; and a search core configured to extract a document number out of a read block read by the block processing circuit and to calculate a score corresponding to the document number.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed novelty, and explain various principles and advantages of those embodiments.

FIG. 1 is a table illustrating an inverted index structure.

DETAILED DESCRIPTION

Various embodiments will be described below with reference to the accompanying figures. Embodiments are provided for illustrative purposes and other embodiments that are not explicitly illustrated or described are possible. Further, modifications can be made to embodiments of the present disclosure that will be described below in detail.

Figure 2:
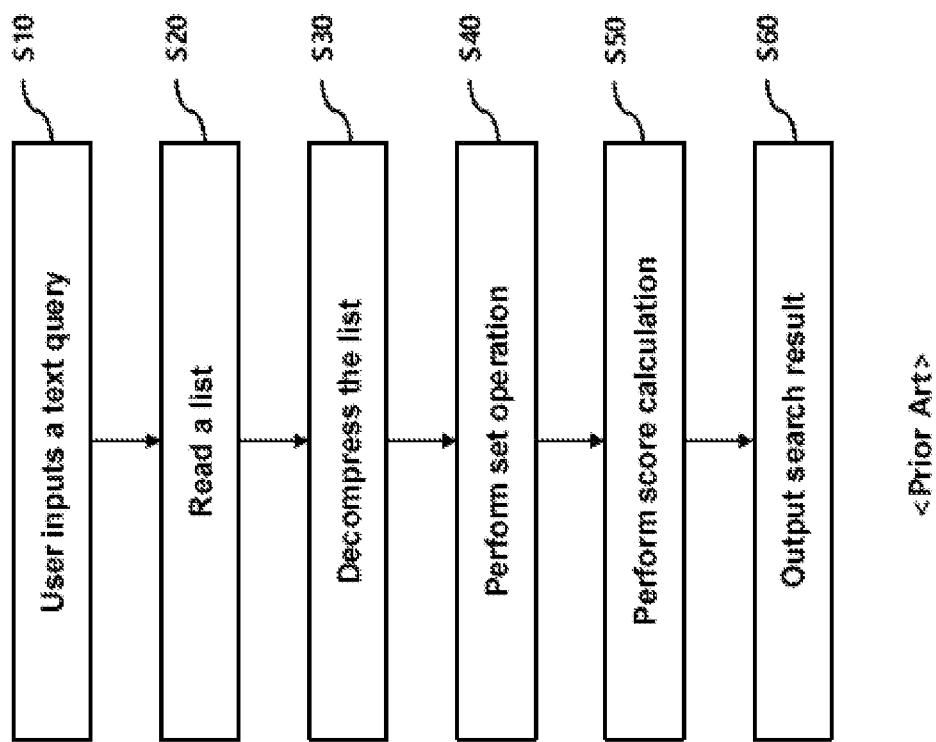
FIG. 2 is a flowchart of a search operation using an inverted index structure.
Figure 3:
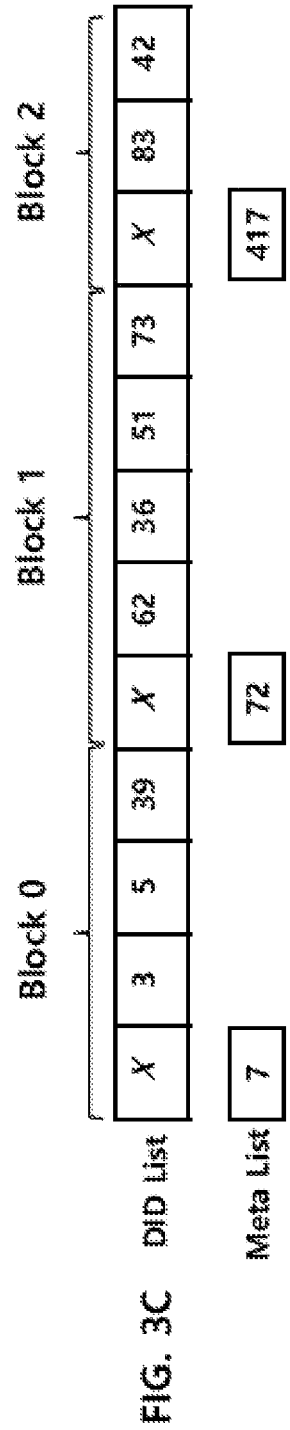
FIGS. 3A, 3B, and 3C are diagrams illustrating a structure of a list according to an embodiment of the present disclosure.

FIGS. 3A, 3B, and 3C are diagrams illustrating a structure of a list according to an embodiment of the present disclosure.

FIG. 3A illustrates a relation between a document number DID and a word frequency TF included in the list.

Document numbers are stored in order of magnitude.

If a document number is stored as it is, number of bits needed to store each document number increases according to the magnitude of the value of the document number, thereby increasing storage space.

Accordingly, delta coding that stores the difference between adjacent document numbers DID may be used as shown in FIG. 3B.

In the delta-coded list, a value corresponding to a difference between a document number of an Nth document in the list and a document number of an (N−1)th document in the list is stored as an Nth element or element N, where N is a natural number. A 0th element of the delta-coded list corresponds to the document number of the 0th (i.e., initial) document in the list.

For example, in FIG. 3B, the 0th document number (here 7) is stored in element 0 of the delta-coded list, and 3, the difference between the $1^{st}$ document number (here 10 as seen in FIG. 3A) and the 0th document number (7), is stored as element 1.

Even if delta coding is performed, there is a problem in that compression efficiency may deteriorate when the difference between consecutive document numbers is large.

Accordingly, in an embodiment of the present disclosure, a delta-coded DID list is divided into a plurality of blocks as shown in FIG. 3C, and a delta-coding compression operation is performed within each block.

In FIG. 3C, the DID list includes a total of 3 blocks from block 0 or 0th block to block 2 or 2nd block, and each block respectively stores 4, 5, and 3 elements.

In this embodiment, the first document number of each block may be separately stored in the meta list. For example, the first document numbers of blocks are 7, 72, 417, which are stored in the meta list. Accordingly, it is advantageous to store only the remaining elements without storing the first document number of each block in the DID list.

The number of blocks included in the DID list and the length of each block may be selected to minimize the size of the data after compression. Since the selection can be performed with various optimization techniques by a person skilled in the art, detailed disclosure thereof will be omitted. The number of entries in the meta list may correspond to the number of blocks in the DID list.

Unlike document numbers, the word frequency of the documents in the list may be stored without being compressed. In this case, the document word frequency may be stored in the form of a separate list from the document number.

Figure 4:
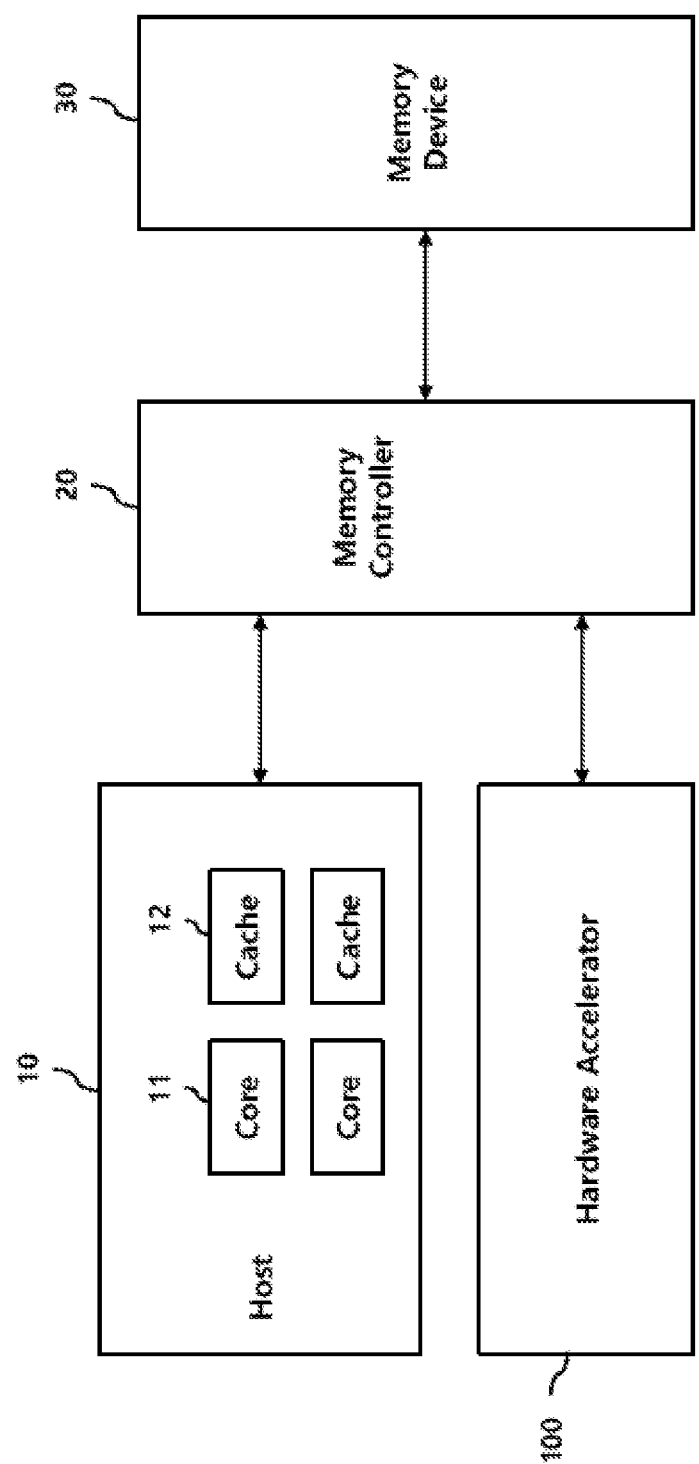
FIG. 4 is a block diagram of a search system according to an embodiment of the present disclosure.

FIG. 4 is a block diagram showing a search system according to an embodiment of the present disclosure.

The search system according to an embodiment of the present disclosure includes a host 10, a memory controller 20, a memory device 30, and a hardware accelerator 100.

The host 10 includes one or more cores 11 and one or more caches 12.

The host 10 may operate under control of driving software that drives a search operation. The driving software generates a search command based on a query input by a user and provides the search command to the hardware accelerator 100.

IN an embodiment, a separate interface may be used between the host 10 and the hardware accelerator 100 to provide the search command.

In this embodiment, instead of using a separate interface, the search command is provided to the hardware accelerator 100 using a memory-mapped register provided at a specific address of the memory device 30.

Since a technology for transmitting a signal using a register mapped to a memory device is a well-known technology, a detailed description thereof will be omitted.

For the initialization operation of the hardware accelerator 100, the driving software may support an initialization function such as "void init (file invFile)".

The initialization function initializes the hardware accelerator 100 and simultaneously stores an inverted index structure stored in the file "invFile" in a predetermined area of the memory device 30.

Although the example here shows the initialization operation "init" not having a return value, in embodiments, the initialization operation may return an indication of whether the initialization operation completed successfully, an indication of the location of the file "invFile" in the memory device, or both.

The driving software may support the following search function to provide a search command.

val search (val qtype, addr list0, size_t length0, addr list1,
        size_t length 1, addr result, val numCores)

The meaning of the arguments used in the above function is shown in Table 1 below.

TABLE 1

| Argument | Meaning |
| --- | --- |
| qtype | Type of a query |
| list0 | Starting address of the $0^{th}$ list |
| length0 | Data size (length) of the $0^{th}$ list |
| list1 | Starting address of the $1^{st}$ list |
| length1 | Data size (length) of the $1^{st}$ list |
| result | Address to store a result |
| numCores | Number of search cores used for processing a search command |

The query type may indicate whether a search is a search for a single word or a union or an intersection search for a combination of multiple words.

In the former case, only information on the 0th list is required in the arguments to the search function, and in the latter case, information on the 0th list and the 1st list are required.

The hardware accelerator 100 must access the memory device 30 to read the list or lists and to store the result.

In this embodiment, the hardware accelerator 100 accesses the memory device 30 through the memory controller 20, and the memory controller 20 schedules memory access requests from the host 10 and the hardware accelerator 100.

Since the detailed configuration and operation of the memory controller 20 are well known, detailed descriptions thereof are omitted.

Figure 5:
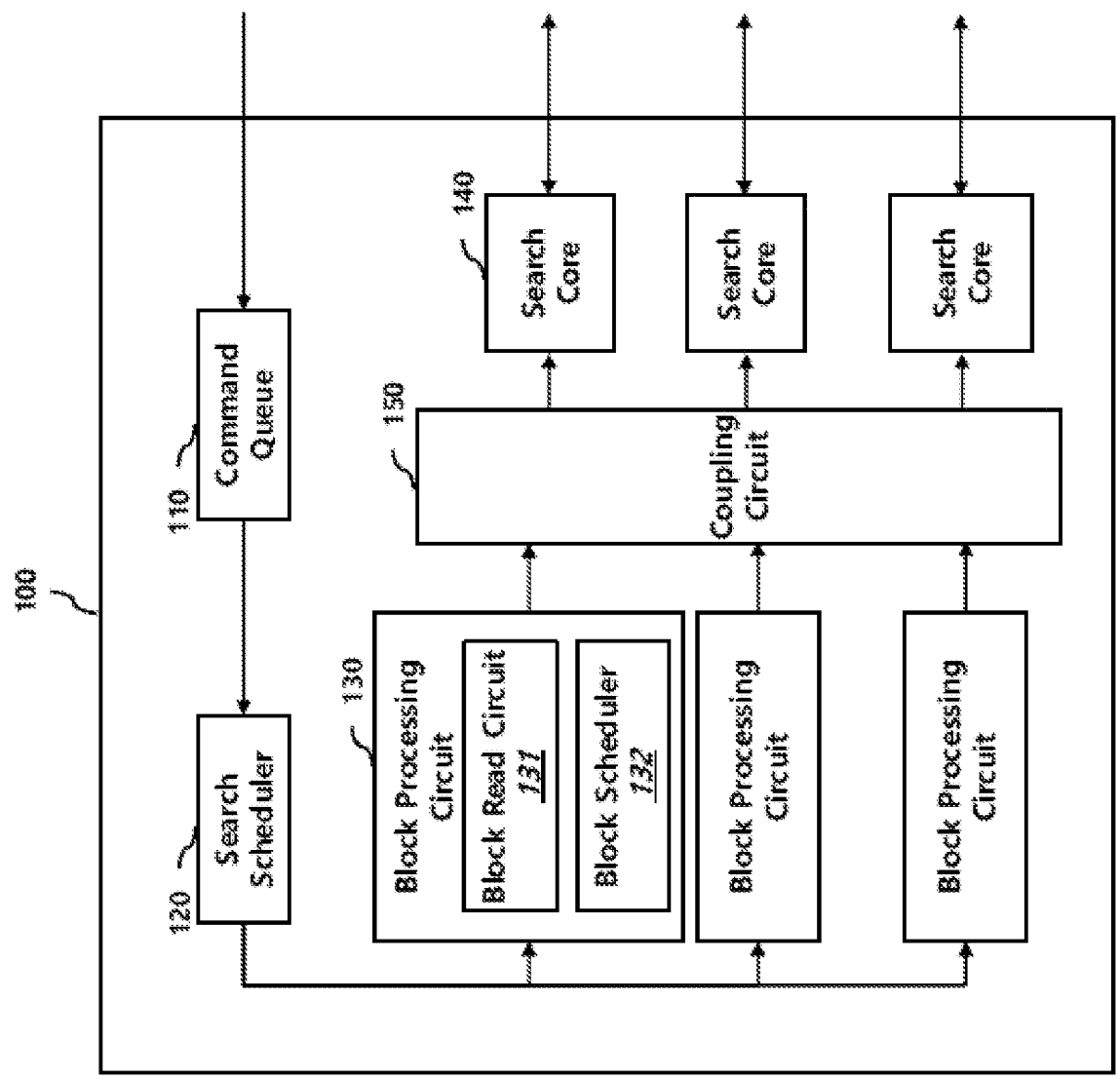
FIG. 5 is a block diagram of a hardware accelerator according to an embodiment of the present disclosure.

FIG. 5 is a block diagram of the hardware accelerator 100.

The hardware accelerator 100 includes a command queue 110, a search scheduler 120, one or more block processing circuits 130, one or more search cores 140, and a coupling circuit 150.

The command queue 110 sequentially stores search commands provided from the host 10.

As described above, since the search command is transmitted using a register mapped to the memory device 30, the search command is input through the memory controller 20.

The search scheduler 120 selects and outputs a search command stored in the command queue 110.

The block processing circuit 130 controls reading, from the memory device 30, a block from a list corresponding to a word.

As described above, information on one or more lists respectively corresponding to one or more words is included as arguments in the search command.

The block processing circuit 130 includes a block read circuit 131 and a block scheduler 132.

The block scheduler 132 controls the block read circuit 131 by referring to a meta list including meta data corresponding to the list. The meta list may be stored in the memory device 30, and may be accessed using information (such as an address of the meta list) included in the information on the list in the arguments in the search command, or information included in a header of the list.

As described above, the meta list may store the first document number of each block of the list. In embodiments where the length of each block of the list may vary, the meta list may also store a length of each block of the list, an indication of a location of each block of the list, or both.

The block read circuit 131 reads a block included in the list from the memory device 30 under the control of the block scheduler 131.

One or more block processing circuits 130 may be included in the hardware accelerator 100; three block processing circuits are shown in FIG. 5.

The search core 140 performs an operation for outputting a result using a block that was read from the memory device 30.

As described above, since the list stored in the memory device 30 is compressed, a decompression operation may be performed at the search core 140. In addition, a set operation and a score calculation may be performed at the search core 140.

Figure 6:
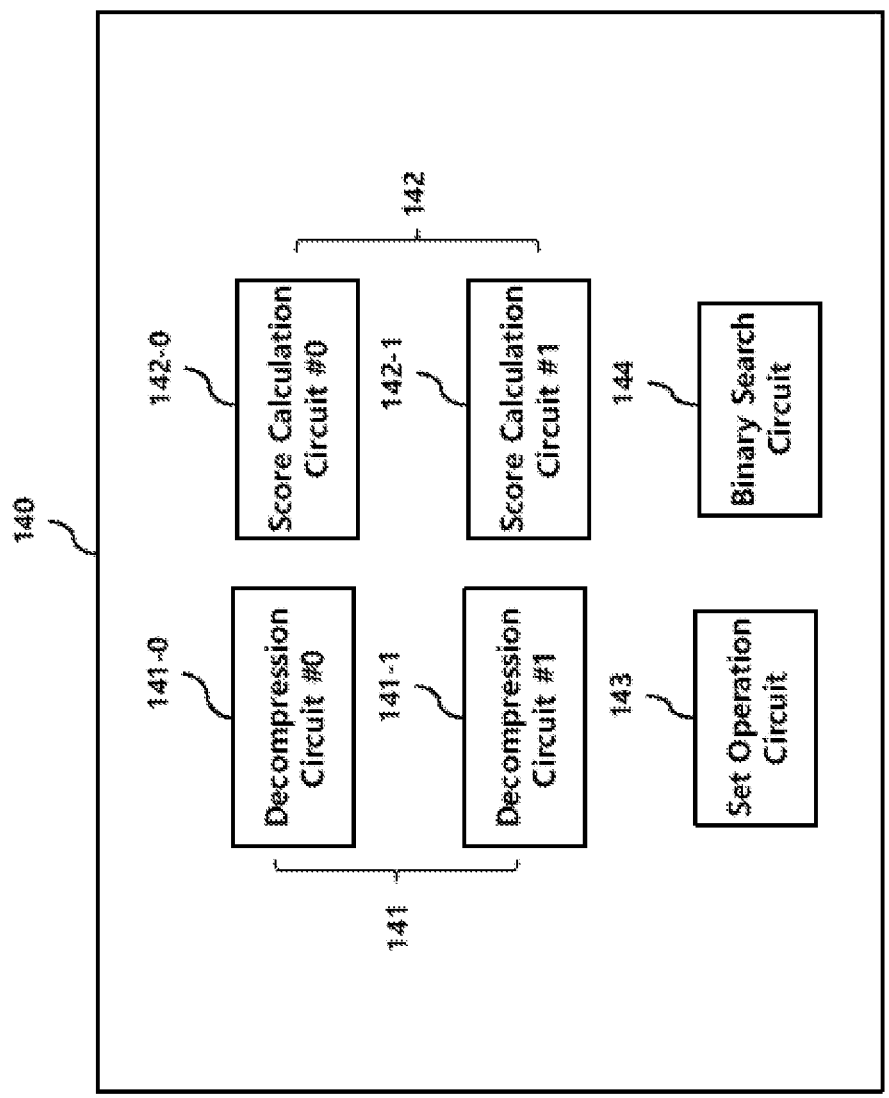
FIG. 6 is a block diagram of a core circuit according to an embodiment of the present disclosure.

FIG. 6 is a block diagram illustrating the search core 140.

The search core 140 includes a decompression circuit 141, a score calculation circuit 142, a set operation circuit 143, and a binary search circuit 144.

The decompression circuit 141 decompresses the list compressed by the block. A document number that identifies a document may be produced through decompression.

The score calculation circuit 142 performs an operation of computing a score for the document identified by the document number output from the decompression circuit 141. To compute the score, the score calculation circuit 142 may use the document number to obtain a word frequency for the document from a list of word frequencies for documents.

In this embodiment, the score calculation operation uses a BM25 algorithm that calculates a score in consideration of the word frequency of the document and total number of words included in the document. The BM25 algorithm is a technology well known in the art, so a detailed description thereof will be omitted.

One or more decompression circuits 141 and one or more score calculation circuits 142 may be included in the search core 140.

In FIG. 6, two decompression circuits 141-0 and 141-1 and two score calculation circuits 142-0 and 142-1 are shown.

The decompression circuit 141-0 may be represented as the 0th decompression circuit 141-0 or the decompression circuit #0 141-0 and the decompression circuit 141-1 may be represented as the 1st decompression circuit 141-1 or the decompression circuit #1 141-1.

The score calculation circuit 142-0 may be represented as the 0th score calculation circuit 142-0 or the score calculation circuit #0 142-0 and the score calculation circuit 142-1 may be represented as the 1st score calculation circuit 142-1 or the 1st score calculation circuit #1 142-1.

The set operation circuit 143 performs operations related to an intersection operation and a union operation.

The intersection operation involves identifying documents included in both of two lists. The intersection operation further includes an operation of determining a final score corresponding to a document by combining respective scores calculated for each of the two lists for documents included in both of the two lists. The process of combining the scores may be variously modified, but in this embodiment, it is assumed that two scores are added.

The union operation performs an operation of outputting scores for documents included in at least one of two lists. In this case, for a document included in only one of the two lists, the final score for the document is the score corresponding to the list that the document is included in, and for a document included in both of the two lists, the final score of the document is a combination of the scores calculated for the document for each of the two lists. The process of combining the scores may be variously modified, but in this embodiment, it is assumed that two scores are added.

The binary search circuit 144 may be used while performing an intersection operation.

The intersection operation involves finding documents included in both of two lists.

In the present embodiment, the block processing circuit 130 reads a list with a shorter length between the two lists, and then the search core 140 checks whether each document included in the short list is included in the longer list.

When the document number included in the shorter list is provided through the decompression circuit 141, the binary search circuit 144 searches for a block of the longer list that may contain the document number, and retrieves a searched block from the memory device 30 and reads the searched block from the memory device 30. For example, the binary search circuit 144 may perform a binary search of the meta list associated with the longer list until it finds an entry in the meta list having a largest document number (of document numbers in the meta list) that is less than or equal to the document number from the shorter list, and then may load the block corresponding to the found entry from the memory device 30.

The binary search circuit 144 may include a portion with a configuration similar to the block processing circuit 130 in order to read a specific block of the longer list from the memory device 30.

One or more search cores 140 may be included in the hardware accelerator 100; three search cores are shown in FIG. 5.

The coupling circuit 150 couples the block processing circuit 130 and the search core 140.

Figure 7:
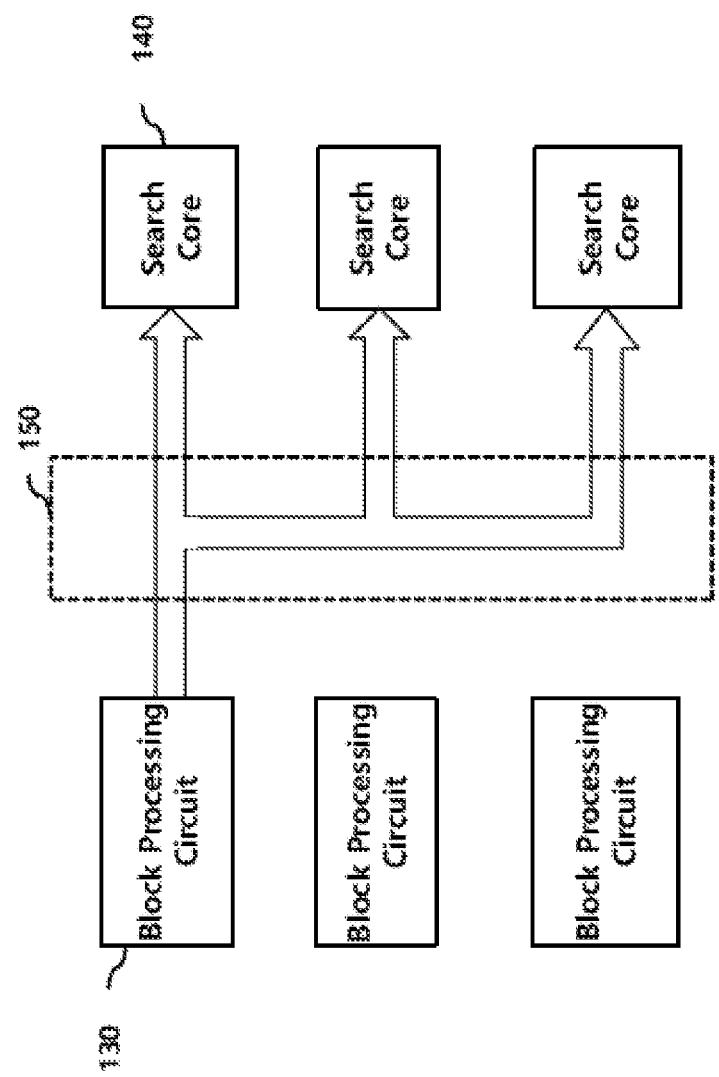
FIGS. 7, 8, and 9 are block diagrams illustrating operations of a coupling circuit according to an embodiment of the present disclosure.
Figure 8:
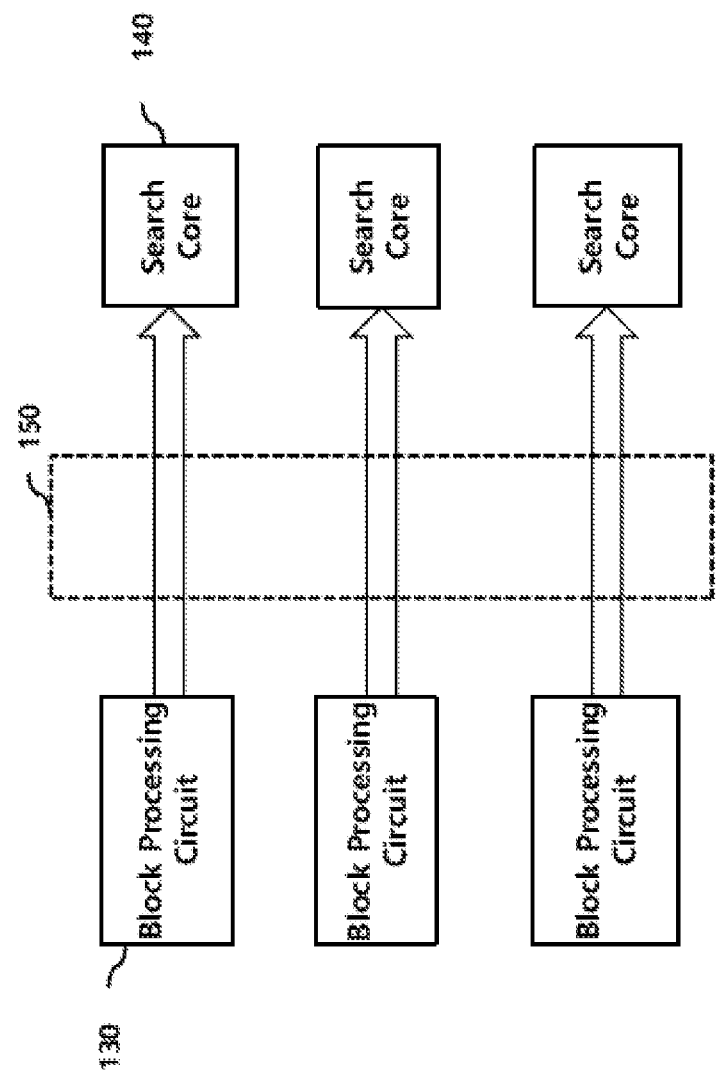
Figure 9:
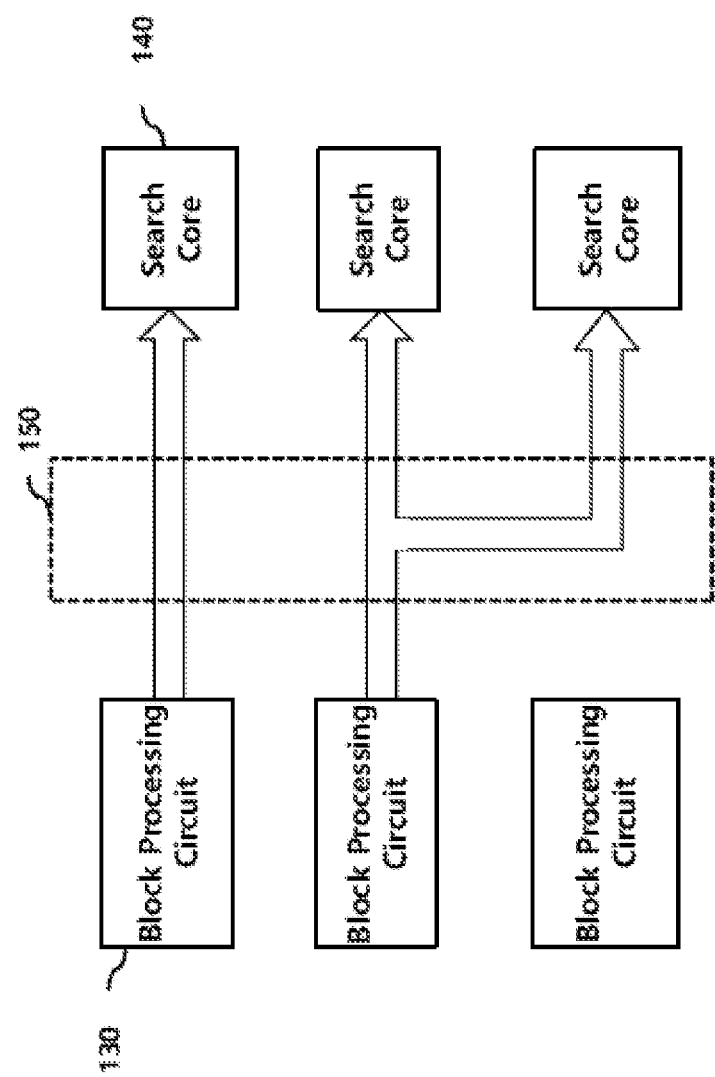

FIGS. 7 to 9 illustrate various coupling configurations between the plurality of block processing circuits 130 and the plurality of search cores 140 that the coupling circuit 150 may be configured to provide.

FIG. 7 shows a case in which one block processing circuit 130 is coupled by the coupling circuit 150 to a plurality of search cores 140.

Through this, it is possible to increase the processing speed by increasing intra-query parallelism when processing one search command.

FIG. 8 shows a case in which a plurality of block processing circuits 130 are coupled by the coupling circuit 150 to a plurality of search cores 140 in a one-to-one manner.

Through this, it is possible to increase the processing speed by increasing inter-query parallelism when processing multiple search commands, where a respective block processing circuit 130 and a respective search core 140 may be used to process each search command.

FIG. 9 shows a case corresponding to a hybrid of the two cases shown in FIGS. 7 and 8.

In FIG. 9, at least one block processing circuit 130 is coupled by the coupling circuit 150 to one search core 140, and at least one other block processing circuit 130 is coupled by the coupling circuit 150 to a plurality of other search cores 140.

The hardware accelerator 100 performs a scheduling operation and a calculation operation in order to process one search command.

During the scheduling operation, the search scheduler 120 may select a search command and determine a coupling configuration of the coupling circuit 150.

During the calculation operation, the search core 140 performs decompression, a set operation, a score calculation, and so on.

Hereinafter, processing a search command in the hardware accelerator 100 is illustrated.

FIGS. 10 to 19 are block diagrams illustrating operations of a hardware accelerator 100 that processes a search command including one word.

Figure 10:
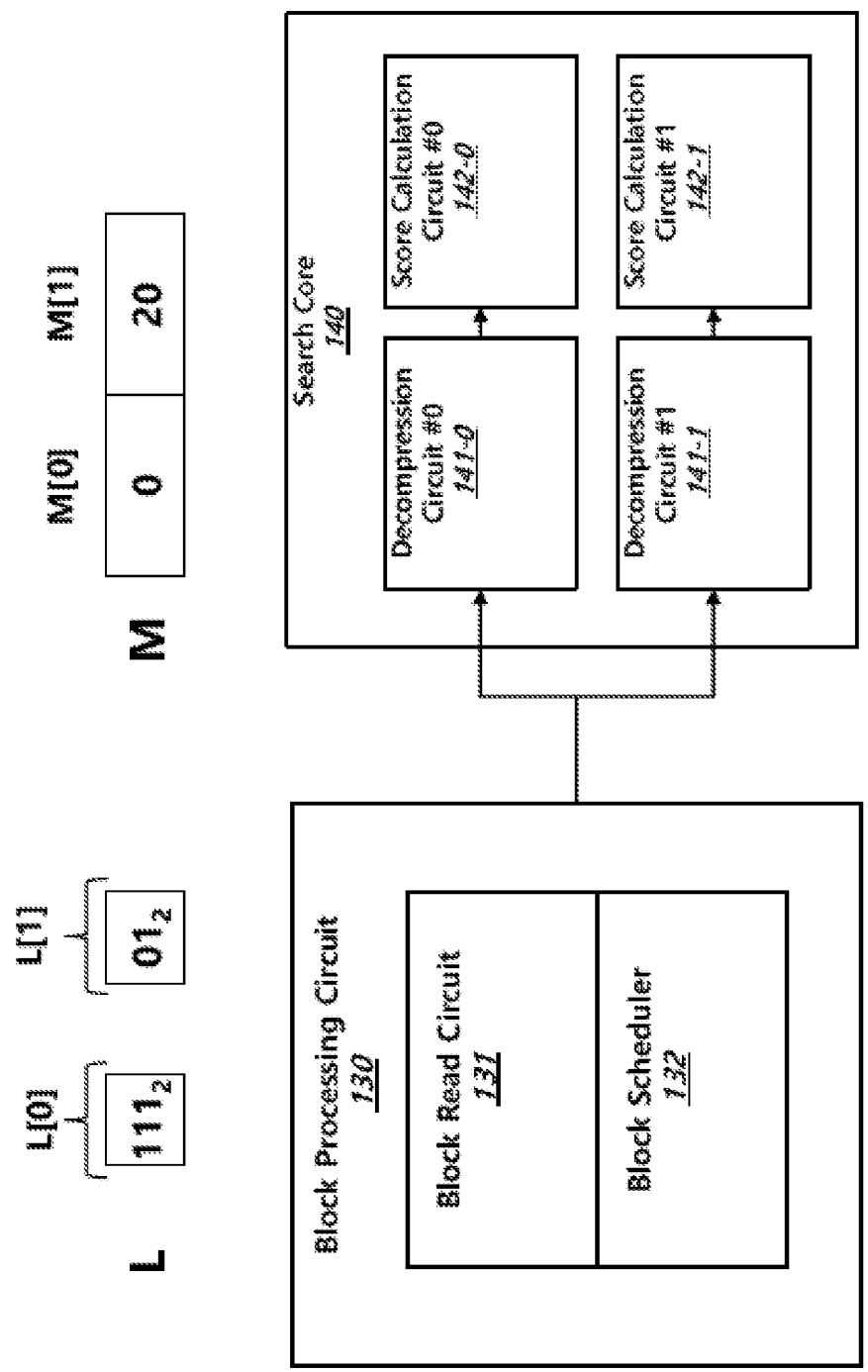
FIGS. 10, 11, 12, 13, 14, 15, 16, 17, 18, 19, 20, and 21 are block diagrams illustrating operations of a hardware accelerator according to an embodiment of the present disclosure.

The example relies on a list L and a meta list M for the list L that are stored in the memory device 30, as shown in FIG. 10.

As described above, in this embodiment, the list L is compressed on a block basis. In the list L and the meta list M, an entry being shown as a binary number of the form 'XXX$_2$' indicates that a corresponding element is compressed.

The meta list M stores the first element of each block included in the list L.

In the illustrated example, the list L contains two blocks and each block contains one element. Since the first document number of each block is stored in the meta list M, each block of the list L corresponds to two elements.

Figure 11:
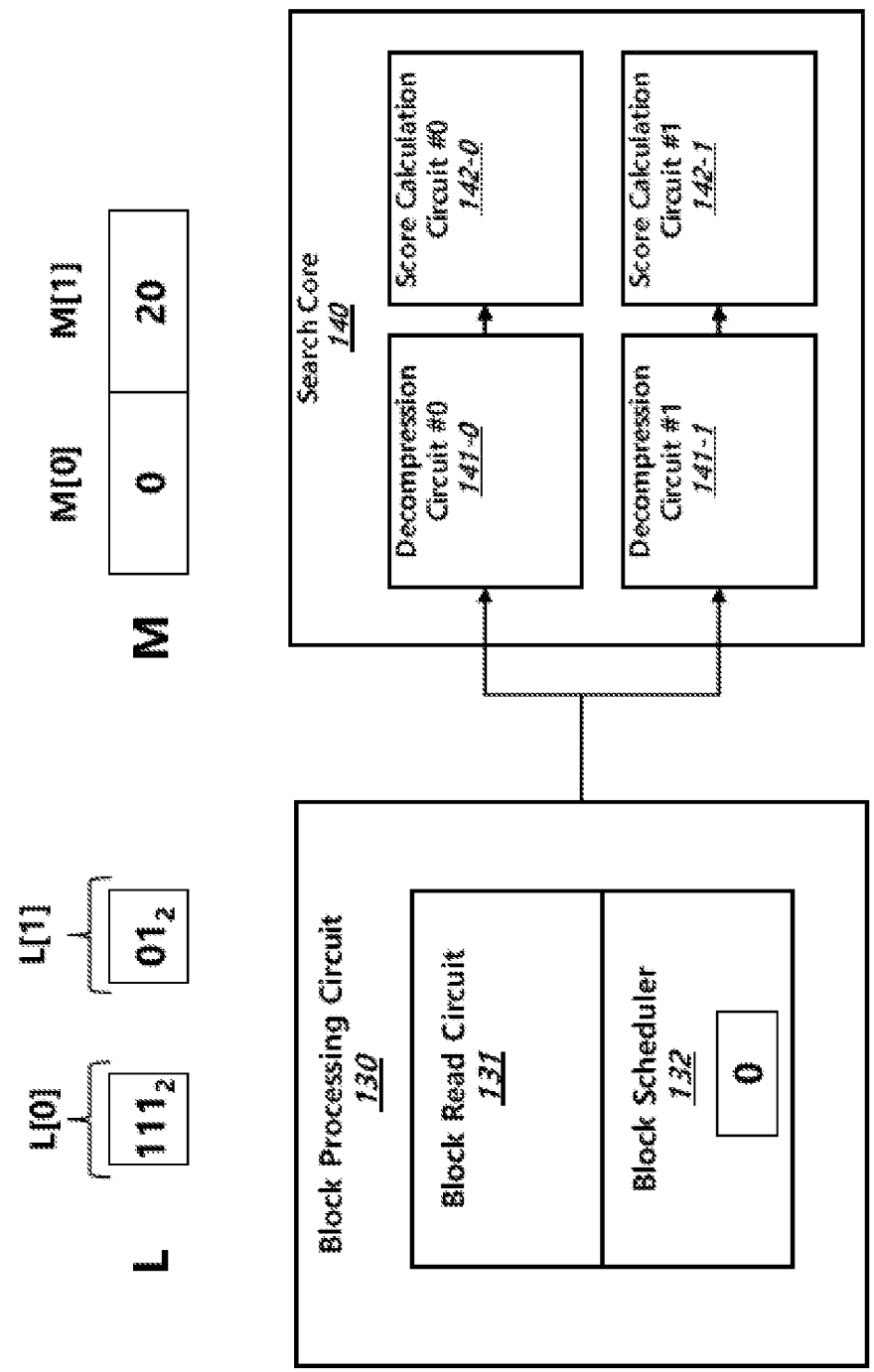

In the first cycle, shown in FIG. 11, the block scheduler 132 reads meta data M[0] corresponding to the 0th block L[0] from the memory device 30.

Figure 12:
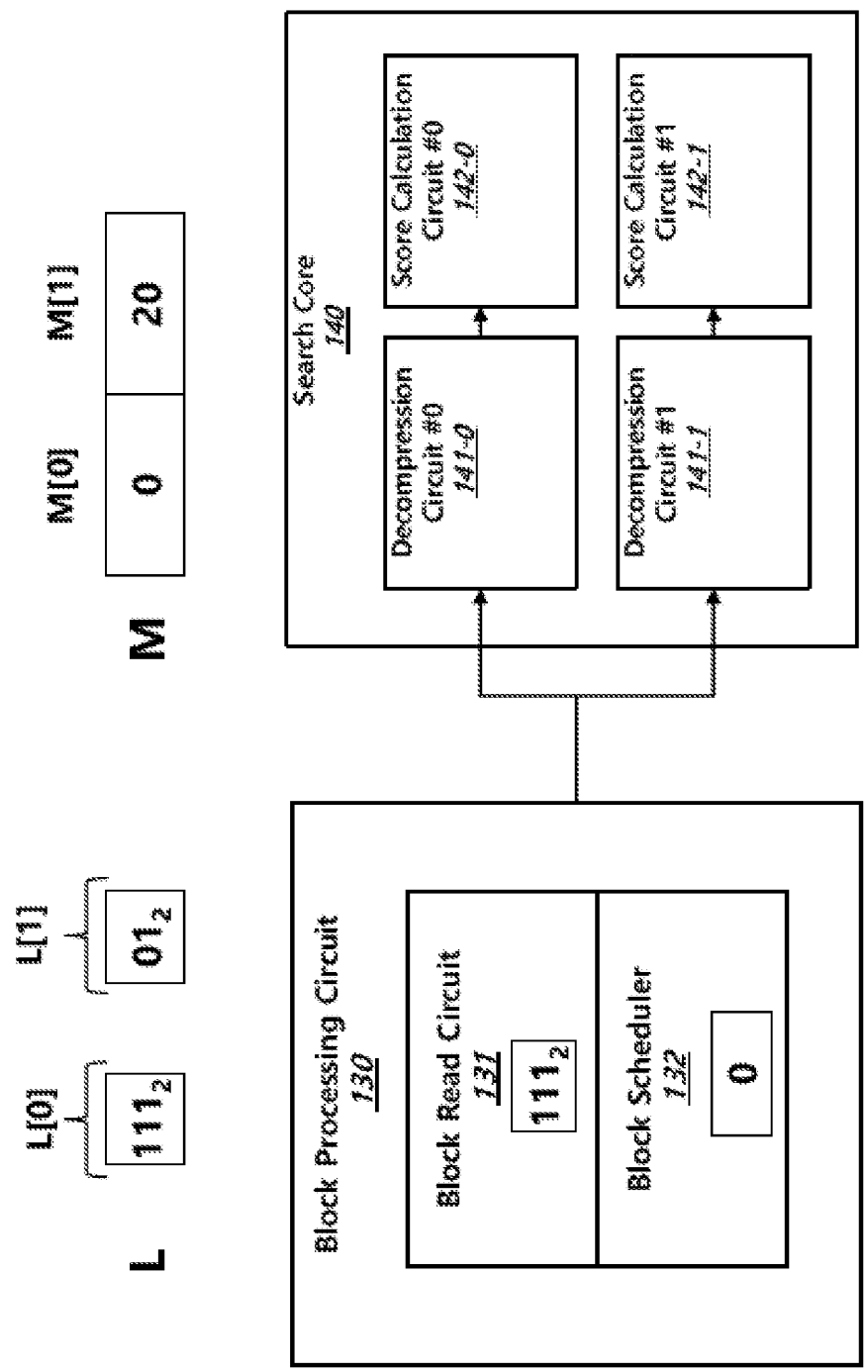

In the second cycle, shown in FIG. 12, the block read circuit 131 reads the 0th block L[0] from the memory device 30.

Figure 13:
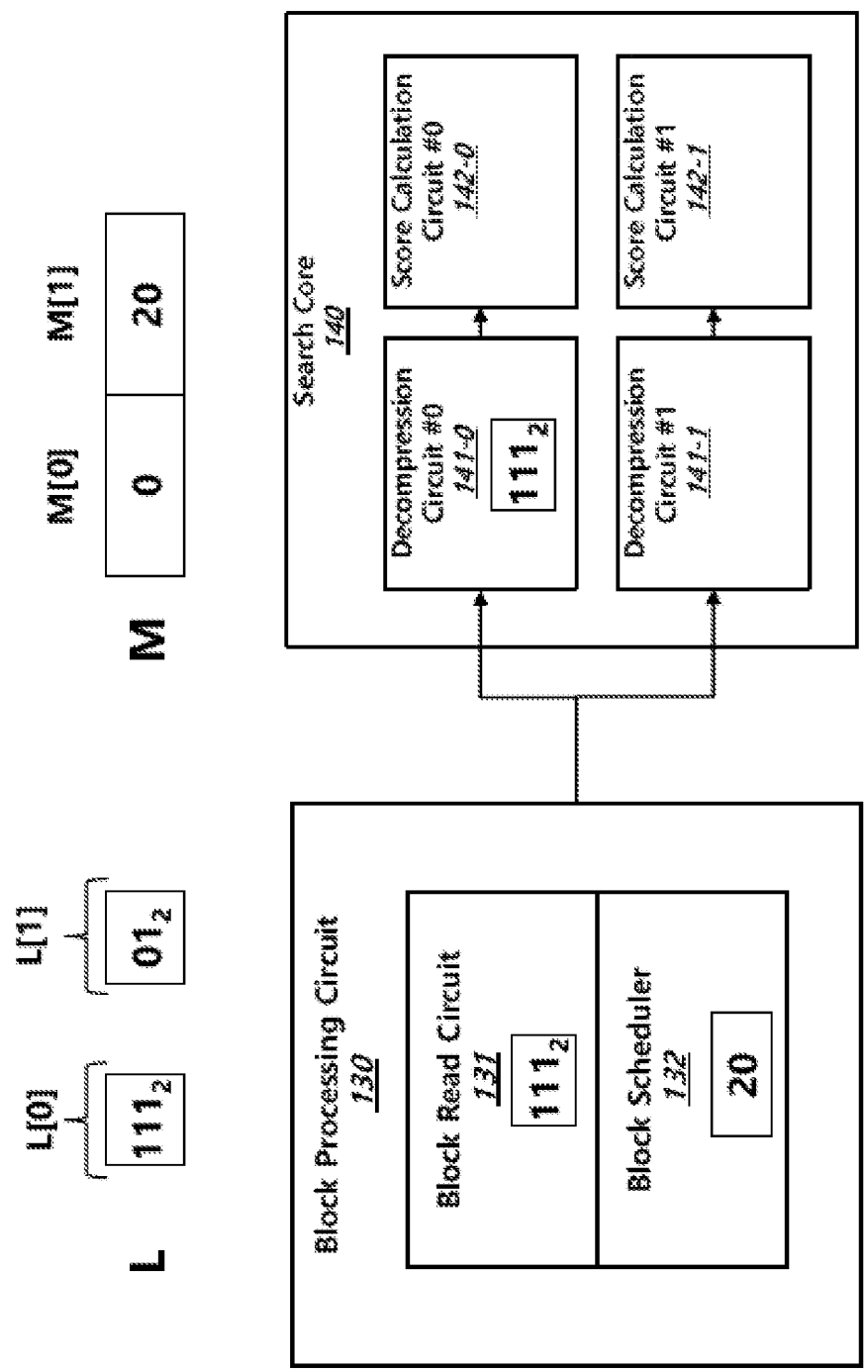

In the third cycle, shown in FIG. 13, the block scheduler 132 allocates the 0th block L[0] to the decompression circuit 141-0 and reads meta data M[1] corresponding to the 1st block L[1] from the memory device 30.

Figure 14:
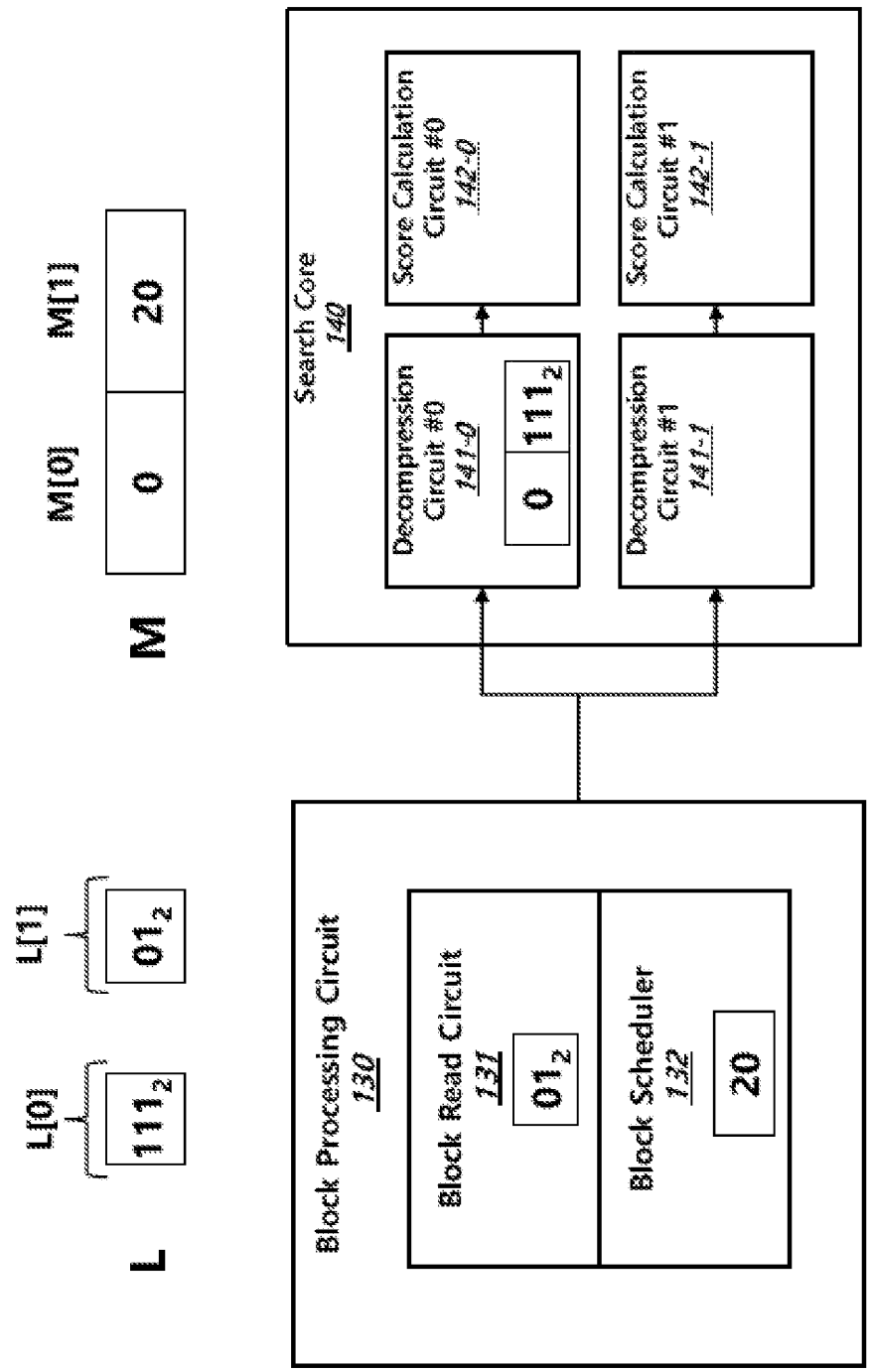

In the fourth cycle, shown in FIG. 14, the 0th block L[0] of the list is decompressed by the decompression circuit 141-0. The first element of the 0th block is the same as that stored in the meta list M, and corresponds to a document with document number 0 (henceforth referred to as document 0).

Figure 15:
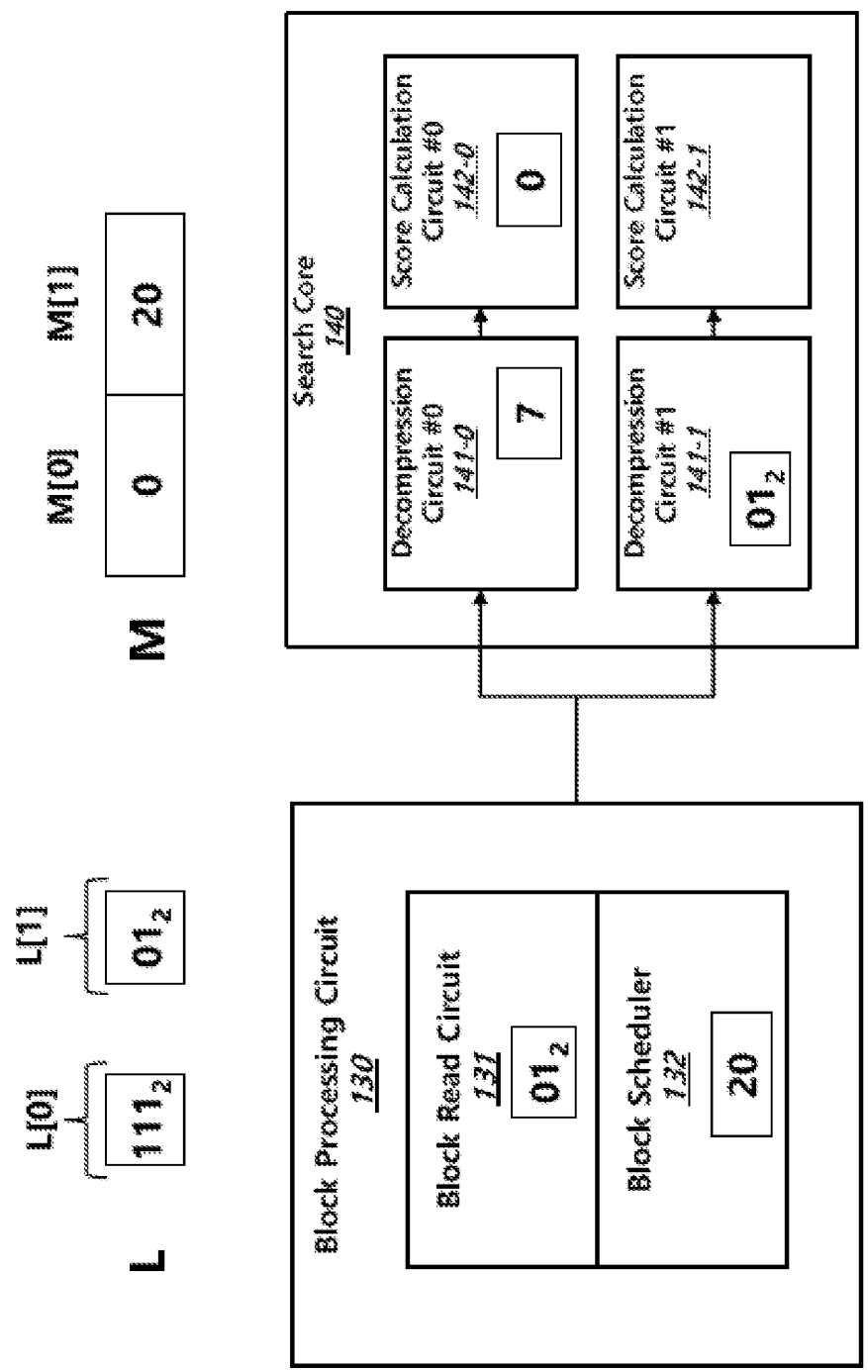

In the fifth cycle, shown in FIG. 15, the score calculation circuit 142-0 calculates a score corresponding to the document number 0, which is the first element of the block 0, using word frequency information associated with the first element of block 0.

The score calculation can use the BM25 algorithm, which calculates the score by considering the document number and word frequency of the document corresponding to the document number. Since the BM25 algorithm is well known, detailed descriptions are omitted.

At the same time, the decompression circuit 141-0 decompresses the second element of the 0th block L[0]. The second element corresponds to 7, which is a sum of 7 to 0.

At the same time, the block scheduler 132 allocates the first block L[1] to the first decompression circuit 141-1.

Figure 16:
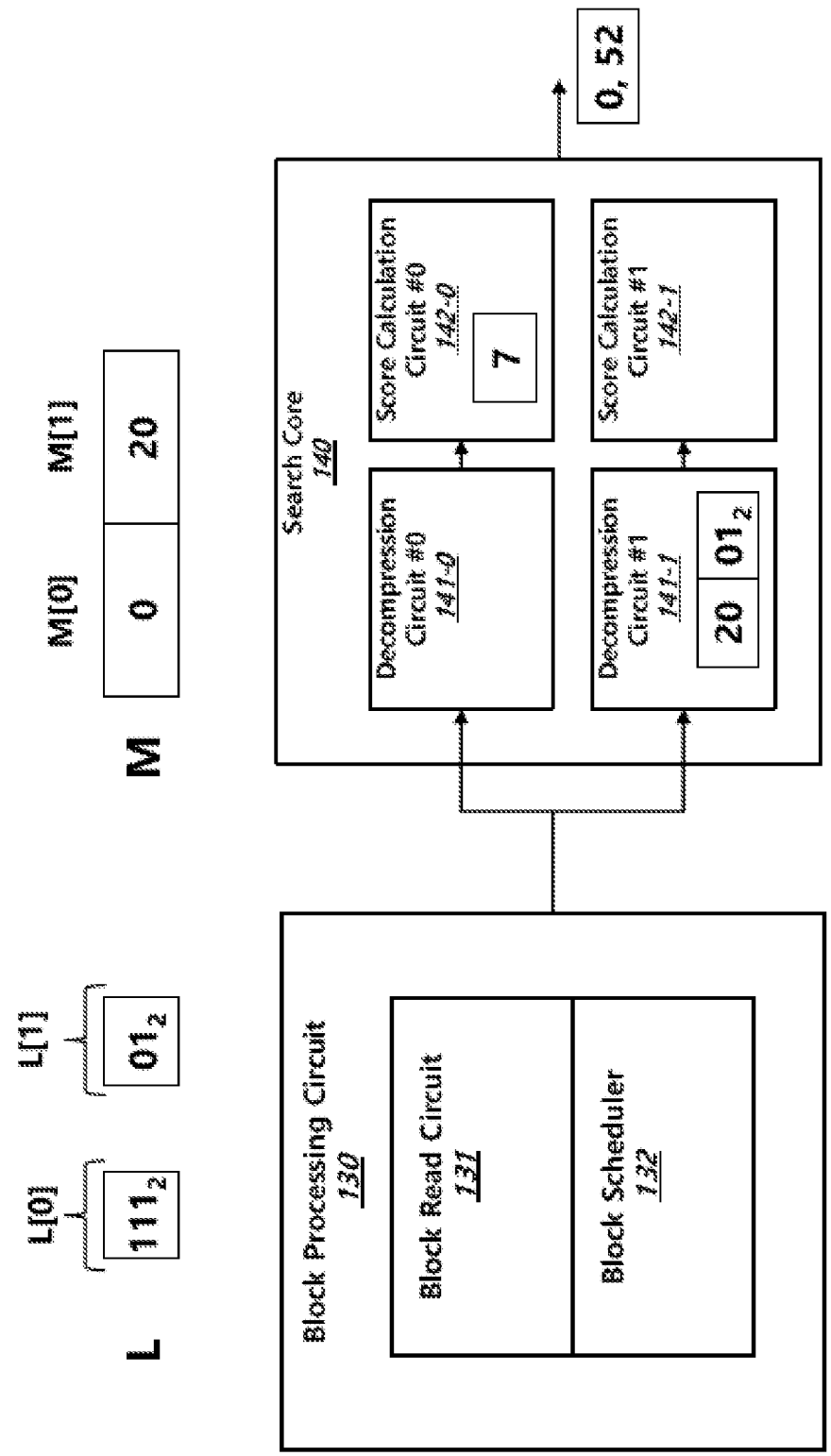

In the sixth cycle, shown in FIG. 16, the block decompression circuit 141-0 sends document number 7, which is the second element of the 0th block L[0], to the score calculation circuit 142-0.

At the same time, the score calculation circuit 142-0 calculates a score for the document number 0 and stores the calculated score 52 in the memory device 30.

At the same time, the decompression circuit 141-1 decompresses the first element of the first block L[1]. At this time, the first element of the first block L[1] is the same as that stored as the first meta data M[1].

Figure 17:
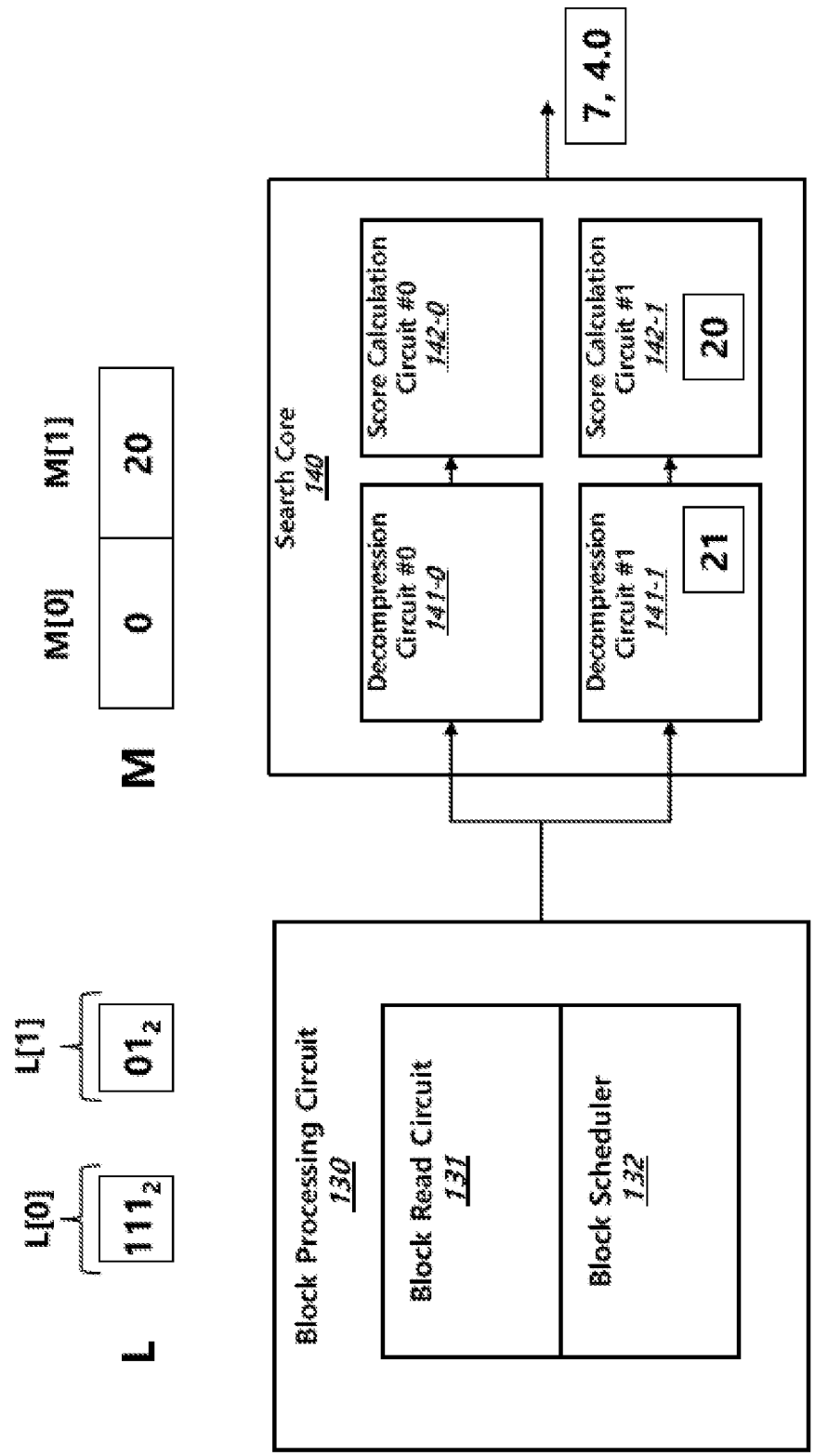

In the seventh cycle, shown in FIG. 17, the score calculation circuit 142-0 calculates a score corresponding to the second element of the 0th block L[0], which is the document number 7, and stores the calculated score 4.0 in the memory device 30.

At the same time, the score calculation circuit 142-1 calculates a score corresponding to the first element of the first block L[1], which is document number 20.

At the same time, the decompression circuit 141-0 decompresses the second element of the first block L[1]. The value of the second element becomes 21, which is a sum of 1 to 20.

Figure 18:
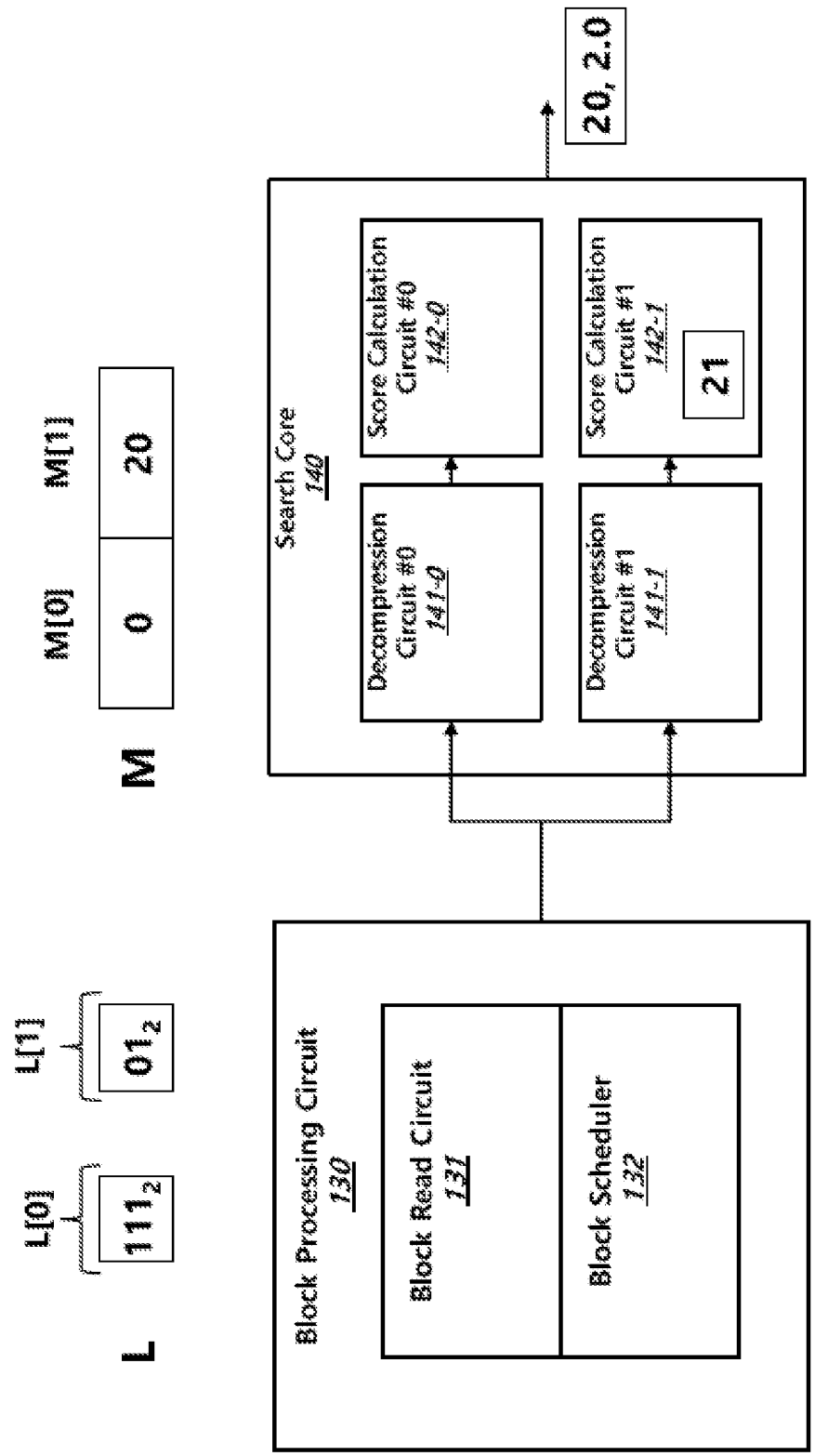

In the eighth cycle, shown in FIG. 18, the score calculation circuit 142-1 calculates a score corresponding to the first element of the first block L[1], which is document number 20, and stores the calculated score 2.0 in the memory device 30 as.

Figure 19:
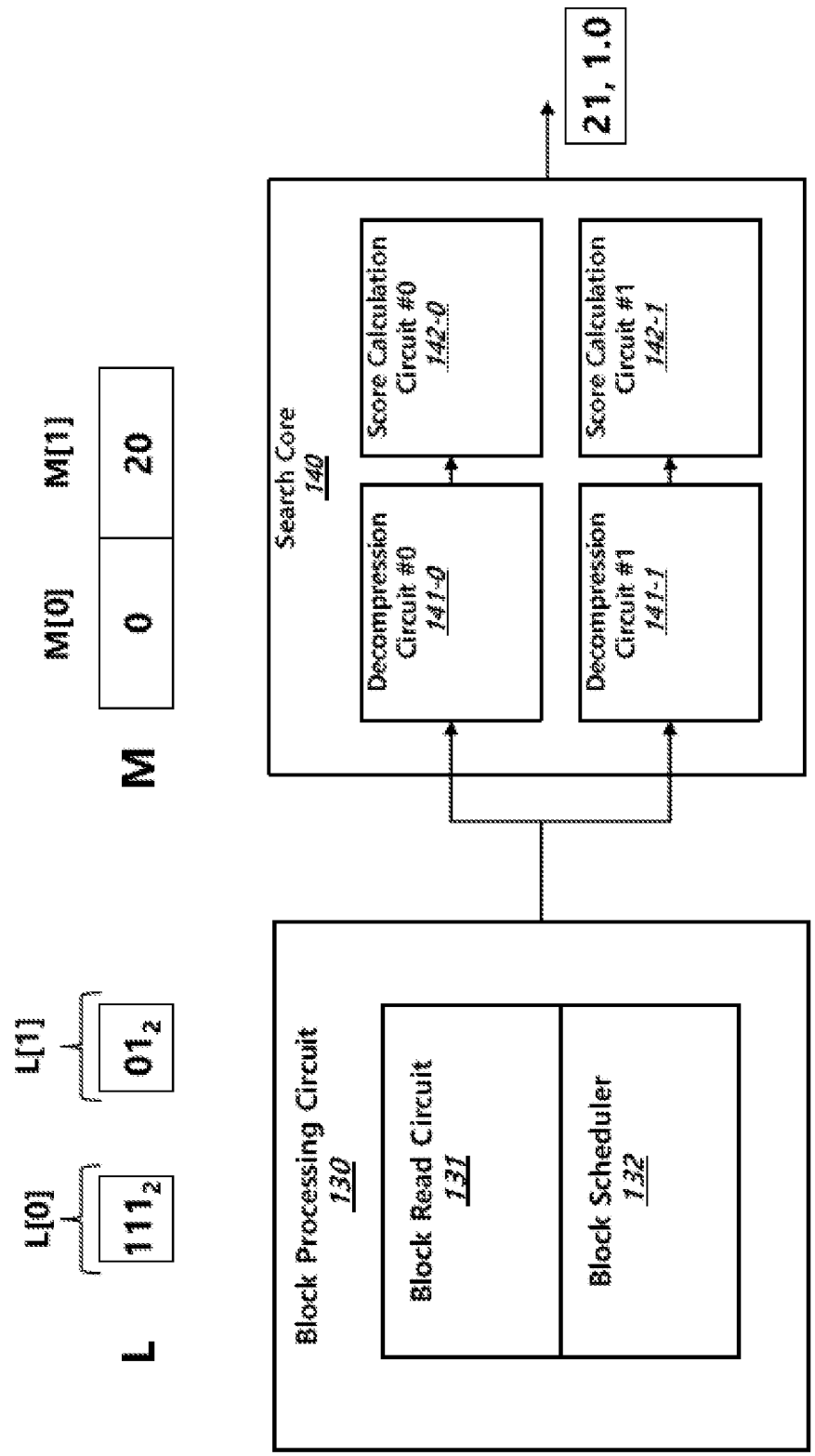

In the ninth cycle, shown in FIG. 19, the score calculation circuit 142-1 calculates a score corresponding to the second element of the first block L[1], which is document number 21, and stores the calculated score 1.0 in the memory device 30.

After the operation of the hardware accelerator 100 is finished, the host 10 may select a document having a highest result among the stored scores.

Figure 20:
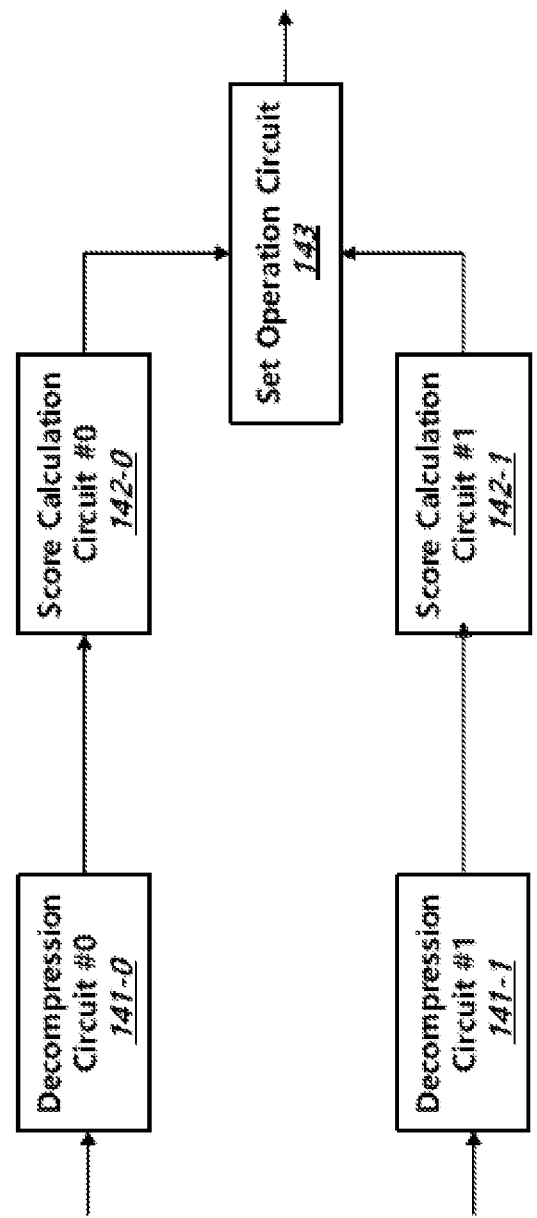

FIG. 20 is a block diagram illustrating processing a search instruction requiring a union operation.

A union operation is performed on two lists.

In the present embodiment, the block processing circuit 130 allocates decompression operations for the two lists to the 0th decompression circuit 141-0 and the 1st decompression circuit 141-1, respectively.

In addition, the score for the document number output from the 0th decompression circuit 141-0 is determined by the 0th score calculation circuit 142-0, and the score for the document number output from the 1st decompression circuit 141-1 is determined in the 1st score calculation circuit 142-1.

The set operation circuit 143 outputs a score output from the 0th score calculation circuit 142-0 and a score output from the 1st score calculation circuit 142-1 to the memory device 30.

In the case of document numbers included in only one list, the set operation circuit 143 provides the score output from the operation circuit processing that list. the case of document numbers included in both of the two lists, the set operation circuit 143 may provide a score by adding scores corresponding to the document number that are respectively output from the two score operation circuits 142-0 and 142-1.

Figure 21:
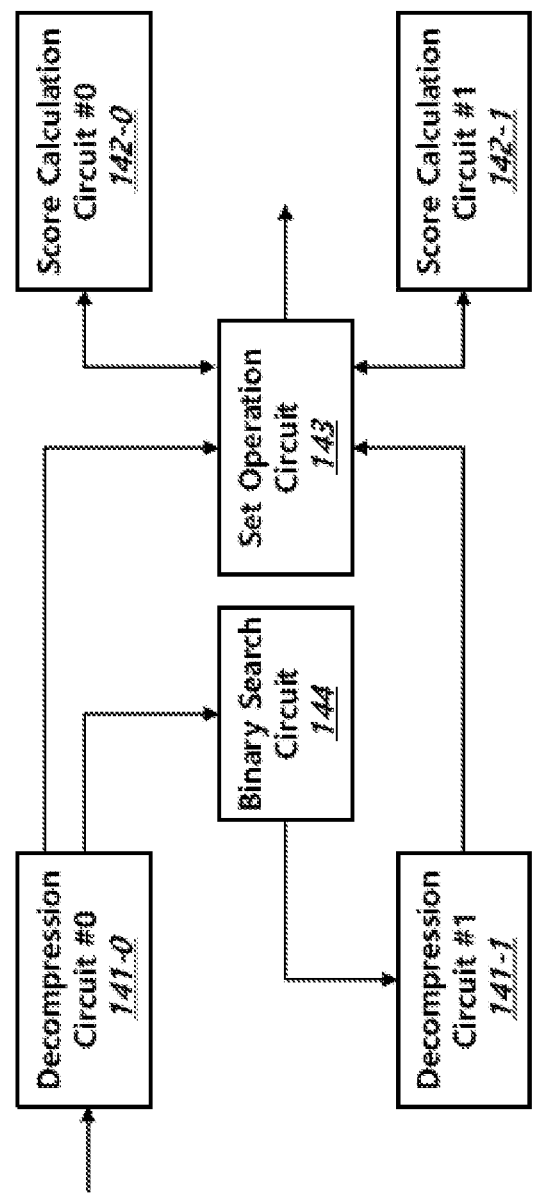

FIG. 21 is a block diagram illustrating processing a search instruction requiring an intersection operation.

The intersection operation is performed on two lists.

In this embodiment, the block processing apparatus 130 allocates a decompression operation for a shorter list between two lists to the 0th decompression circuit 141-0.

The 0th decompression circuit 141-0 provides the document number to the binary search circuit 144 and the set operation circuit 143.

The binary search circuit 144 reads from the memory device 30 a specific block that may contain a corresponding document number from the longer list.

As described above, since the meta list for the list includes a value of the first element of each block and the document numbers of the list are arranged in order of magnitude, a specific block can be found by a binary search technique that traverses the meta list until a block that might include the sought document number is found.

The binary search circuit 144 allocates a read block to the first decompression circuit 141-1, and the first decompression circuit 141-1 provides a document number included in the read block to a set operation circuit 143.

The set operation circuit 143 provides a score by combining scores from the 0th score calculation circuit 142-0 and the 1st score calculation circuit 142-1 for a document number provided from both the 0th decompression circuit 141-0 and the 1st decompression circuit 142-1.

In this embodiment, the set operation circuit 143 provides the score by adding the scores output from the two score calculation circuits 142-0 and 142-1.

Although various embodiments have been described for illustrative purposes, various changes and modifications may be possible.

What is claimed is:

1. A search system, comprising:
   a memory device storing an inverted index structure including a word and a list corresponding to the word;
   a host configured to provide a search command including one or more words; and
   a hardware accelerator configured to generate a search result corresponding to the search command using the inverted index structure,
   wherein the hardware accelerator includes:
   a block processing circuit configured to read a block from a list stored in an inverted index structure;
   a search core configured to extract a document number out of a read block read by the block processing circuit and to calculate a score corresponding to the document number, and
   a coupling circuit configured to couple the block processing circuit and the search core,
   wherein the hardware accelerator comprises a plurality of the block processing circuits and a plurality of the search cores, and
   wherein the coupling circuits couples the plurality of the block processing circuits to the plurality of the search cores.

2. The search system of claim 1, wherein the block processing circuit comprises:
   a block scheduler configured to determine an order of reading of one or more blocks included in the list; and
   a block read circuit configured to read a block selected by the block scheduler.

3. The search system of claim 1, wherein the search core comprises a score calculation circuit to calculate a score corresponding to a document number.

4. The search system of claim 3, wherein the search core comprises a decompression circuit that extracts a document number by decompressing a block.

5. The search system of claim 3, wherein the search core comprises a plurality of the score calculation circuits, and
   wherein the plurality of the score calculation circuits calculate scores corresponding to document numbers included in different blocks.

6. The search system of claim 5, wherein the search core includes a set operation circuit performing a union operation or an intersection operation for document numbers included in different blocks.

7. The search system of claim 6, wherein the search core includes a binary search circuit that use a document number in one block among the different blocks to select an other block among the different blocks.

8. The search system of claim 1, wherein the hardware accelerator comprises:
   a command queue configured to store search commands; and
   a search scheduler configured to select a search command from the command queue.

* * * * *